United States Patent [19]

Hatanaka

[11] Patent Number: 4,884,407
[45] Date of Patent: Dec. 5, 1989

[54] TURBO COMPOUND ENGINE

[75] Inventor: Kazuhiro Hatanaka, Kawasaki, Japan

[73] Assignee: Isuzu Motors Limited, Tokyo, Japan

[21] Appl. No.: 262,404

[22] Filed: Oct. 25, 1988

[30] Foreign Application Priority Data

Oct. 28, 1987 [JP] Japan ................................ 62-270322

[51] Int. Cl.[4] .............................................. F02G 5/00
[52] U.S. Cl. ...................................... 60/614; 60/624
[58] Field of Search ................................ 60/614, 624

[56] References Cited

U.S. PATENT DOCUMENTS

| 2,375,852 | 5/1945 | Kilchenmann | 60/624 X |
| 4,748,812 | 6/1988 | Okada et al. | 60/624 X |
| 4,800,726 | 1/1989 | Okada et al. | 60/624 X |

FOREIGN PATENT DOCUMENTS

| 61-921 | 3/1986 | Japan | 60/624 |
| 286531 | 12/1986 | Japan | 60/624 |

Primary Examiner—Michael Koczo
Attorney, Agent, or Firm—Dykema Gossett

[57] ABSTRACT

A turbo compound engine which comprises an engine having an intake air passage, an exhaust gas passage and a crankshaft, a power turbine disposed in the exhaust gas passage so as to be rotatable in normal and reverse senses, a reversing mechanism for connecting the power turbine with the crankshaft, an exhaust bypass line connected to the exhaust gas line so as to bypass the power turbine, first and second shut-off valves respectively disposed in the exhaust gas line upstream of the junctions of the exhaust bypass line and the exhaust gas passage, so that they may be closed upon reversed switching of the reversing mechanism an intake air bypass line connected to the intake air passage at one end thereof and to the exhaust gas passage downstream of the power turbine and upstream of one of the junctions with the exhaust bypass line at the other end, a third shut-off valve disposed in the intake air bypass line so as to be opened as the rotation of the power turbine is reversed and reaches a predetermined value.

11 Claims, 5 Drawing Sheets

TURBO COMPOUND ENGINE

BACKGROUND OF THE INVENTION

1. Technical Field

The present invention relates to a turbo compound engine provided with a power turbine for recovering the exhaust gas energy and returning the recovered energy to the crankshaft of the engine. More particularly, the present invention relates to a turbo compound engine system which produces braking effort by rotating the power turbine in a reverse sense by the crankshaft during engine braking.

2. Background Art

The Assignee of the present invention has proposed a "Turbo Compound Engine" (Japanese Patent Application No. 61-228107), which is a system for obtaining braking effort by rotating a power turbine in a reverse sense with the power turbine being provided in the exhaust gas line of the engine.

In this proposal, as depicted in FIG. 6, a power turbine 51 for recovering the exhaust gas energy is provided in the exhaust gas line 53, a fluid passage 57 which bypasses the power turbine 51 is connected to the exhaust gas line 53, and a fluid passage switching means 55 is provided to the fluid passage 57. The fluid passage switching means 55 is constructed such that the exhaust gas line 53a parallel to the fluid passage 57 may be closed when the exhaust brake is applied and rotation power is transmitted from the crankshaft 59 to the power turbine 51 while opening the fluid passage 57.

The power turbine has to be driven at a rotational speed between 80,000 and 100,000 rpm in order to be effectively utilized. Therefore, when the power turbine 51 is reversed in its rotational direction, considerable load is imposed on a power transmission system 61 between the crankshaft 59 and the power turbine 51.

As indicated by braking effort characteristic curve I in FIG. 4, if the power turbine functions as a compressor as the rotation of the power turbine is reversed from normal direction to reverse direction, the load against the crankshaft sharply increases, which is called overshoot, just after the rotation of the power turbine reaches zero, i.e., just after the power turbine starts rotating in a reverse sense. This is because the power turbine performs both compressor work and air mixing work when it is reversed. To overcome this shortcoming when the turbo compound engine of the above proposal is employed, the power transmission system between the crankshaft and the power turbine has to possess strength enough to counterbalance the overshoot or the power turbine has to be rotated slowly enough not to damage the power transmission system. Either case is undesirable in terms of total braking effort and cost.

SUMMARY OF THE INVENTION

One objective of the present invention is to provide a turbo compound engine system in which the above mentioned overshoot is eliminated.

According to one aspect of the present invention, there is provided a turbo compound engine comprising a power turbine disposed in the exhaust gas line of the engine and connected with the crankshaft via a reversing mechanism, an exhaust bypass line bypassing the power turbine, a reversing mechanism interposed between the crankshaft and the power turbine so as to change the rotational direction of the power turbine, two shut-off valves respectively provided in the exhaust gas line at positions upstream of two junctions of the exhaust gas line and the exhaust bypass line such that they are closed upon reversing of the power turbine, an intake air bypass line branched from the intake air line of the engine and connected to the exhaust gas line between the power turbine and the exhaust bypass, and another shut-off valve disposed in the intake air bypass line such that it is opened when the power turbine reaches a predetermined rotational speed in a reverse sense.

According the turbo compound engine constructed as described above, the two shut-off valves in the exhaust bypass line are closed as the rotation of the power turbine is reversed by the reversing mechanism. The power turbine then performs gas mixing work, i.e., the power turbine mixes the exhaust gas in the exhaust gas line, whereby a braking effort corresponding to exhaust gas pressure rise and another braking effort in response to said mixing work are produced. When the rotational speed of the power turbine in the reverse direction reaches a certain value and the shut-off valve in the intake air bypass line is opened, the power turbine performs air compressing work since it introduces air through the intake air bypass line in response to rotation of itself. However, at this time three shut-off valves are adjusted such that the overshoot does not appear, thereby aquiring a desired braking effort whose maximum value is below a predetermined one. Moreover, compared with the turbo compound engine system described in the "Background Art" section above, the upper limit of braking effort can be raised. Also, the power transmission line between the crankshaft and the power turbine will not be damaged.

The above mentioned and other aspects, objectives, and advantages of the present invention will be more fully understood by the detailed description with reference to the attached drawings and the claims.

DESCRIPTION OF THE PREFERRED EMBODIMENTS

Now, preferred embodiments of the present invention will be explained with reference to the accompanying drawings.

Figure 1:
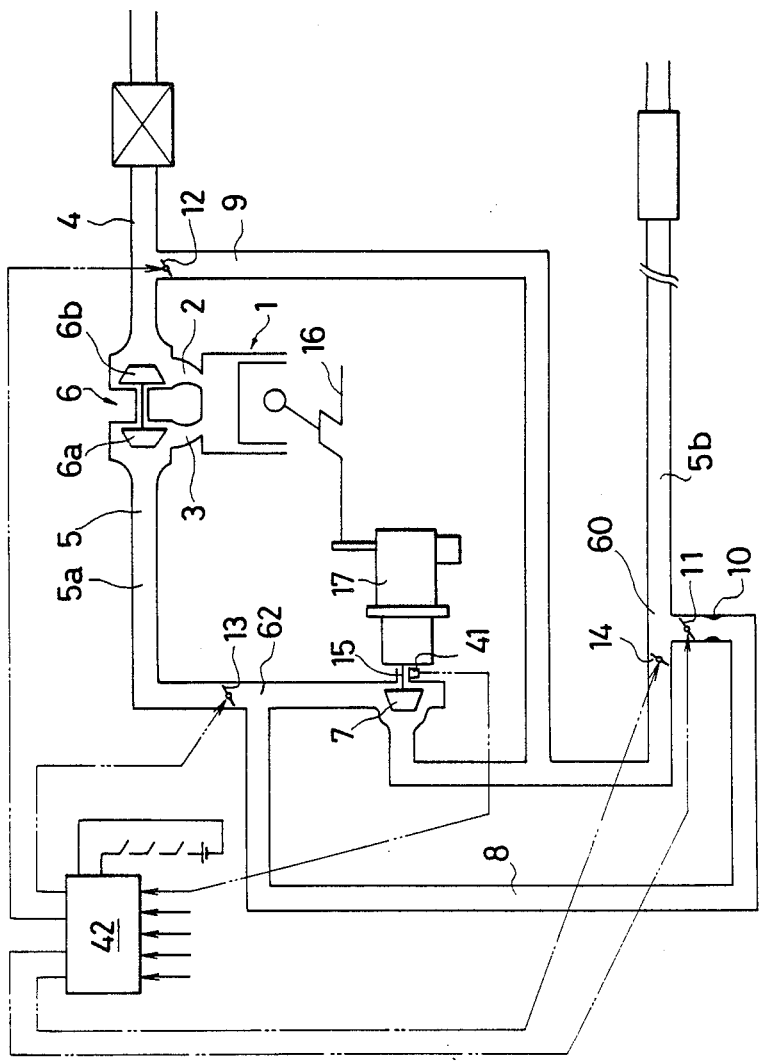
FIG. 1 is a schematic overall view of a turbo compound engine according to the present invention.

Referring to FIG. 1, reference numeral 1 designates an engine, 2 an intake air port of the engine 1, and 3 an exhaust port of the engine 1. As illustrated in FIG. 1, an intake air passage 4 is connected to the intake air port 2, and an exhaust gas passage 5 is connected to the exhaust gas port 3. Near the upstream end of the exhaust gas line 5, a turbine 6a of the turbocharger 6 is disposed and a power turbine 7 is provided in the exhaust gas line 5a downstream of the turbine 6a. The compressor 6b of the turbocharger 6 is disposed near the downstream end of the intake air passage 4. An exhaust gas bypass line 8 is provided to the exhaust line 5 with one end or a junction thereof 62 being connected to the exhaust line 5a upstream of the power turbine 7 and the other junction 60 connected to the exhaust line 5b downstream of the power turbine 7. The exhaust line 5 and the intake line 4 are coupled with an intake air bypass line 9 which is branched from the intake air line 4 upstream of the compressor 6b and connected to the exhaust line 5 downstream of the power turbine 7 and upstream of the junction 60.

Near the downstream end of the exhaust bypass line 8, an unadjustable throttling portion 10, which optimizes the pressure difference across the power turbine 7, is formed and downstream thereof a shut-off valve 11 (called "fourth valve" hereinafter) is provided. Another shut-off valve 12 (called "third valve" hereinafter) is provided in the intake bypass line 9 near the upstream end thereof so as to close/open the intake bypass line 9. In the exhaust gas line 5, shut-off valves 13 (called "first valve") and 14 (called "second valve") are provided upstream of the junctions 60 and 62 respectively so that the exhaust line 5a and 5b are respectively opened/closed. In this embodiment, electromagnetic valves are employed as the first through fourth valves 11–14.

Figure 2:
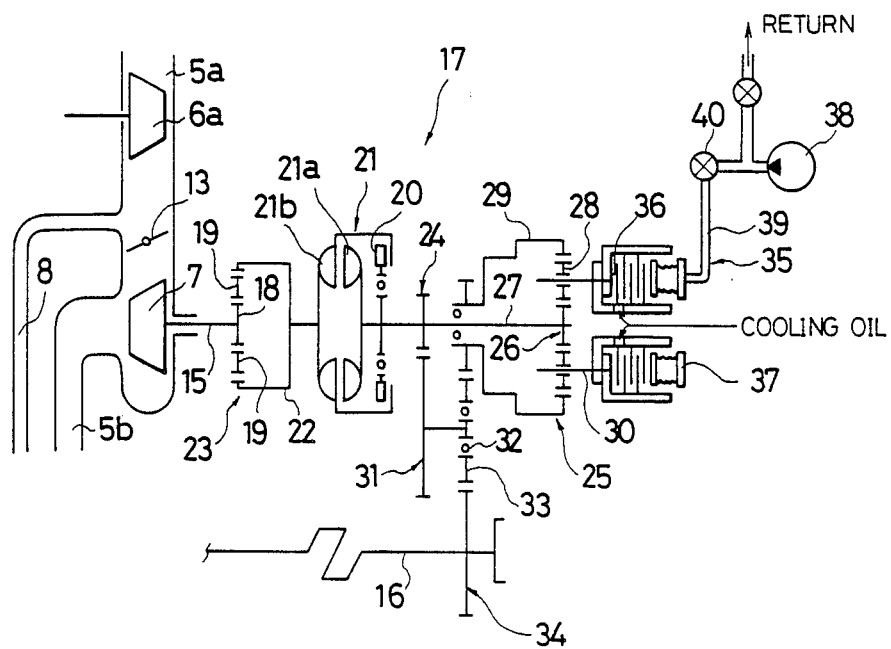
FIG. 2 depicts a reversing mechanism of FIG. 1.

The crankshaft 16 and the power turbine 15 are connected to each other by a reversing mechanism 17 which transmits rotational power between the crankshaft 16 and the power turbine 15 in both directions. The reversing mechanism 17 is illustrated in FIG. 2. An output gear 18 is secured to an end of a shaft 15 of the power turbine 7, and plural planetary gears 19 engage with the output gear 18. The planetary gears 19 engage with a ring gear 22 which is rotated with an output pump wheel 21b of a fluid coupling 21 provided with a lock-up mechanism. In other words, the output gear 18 is connected to the fluid coupling 21 via a planetary gear mechanism 23 (called "first planetary gear mechanism" hereinafter) including the planetary gears 19 and the ring gear 22, so that the rotational power is transmitted from the power turbine 7 to the output pump wheel 21a of the fluid coupling 21. A first transmission gear 24 is secured to the output pump wheel 21a so that those two elements may rotate together.

Another planetary gear mechanism 25 (called "second planetary gear mechanism" hereinafter) is provided next to the first planetary gear mechanism 23. The second planetary gear mechanism 25 comprises a sun gear 26 whose shaft 27 is connected to the output pump wheel 21a, plural planetary gears 28 geared with the sun gear 26, a ring gear 29 geared with the planetary gears 28, a carrier 30 which causes the planetary gears 28 to rotate around the sun gear 26 as well as their own axes, a second transmission gear 31 geared with the first transmission gear 24, a third transmission gear 33 provided coaxial with the second transmission gear 31 and transmitting the rotational power from the crankshaft gear 34 to the second transmission gear 31 via a one-way clutch 32, and hydraulic clutch means 35 which stops/frees the carrier 30. In this embodiment, the hydraulic clutch means 35 is constructed such that it is connected/disconnected with a clutch portion 36 which is shaped like a flange extending in the radial direction of the carrier 30, and includes a hydraulic clutch 37 for stopping the rotation of the carrier 30, a pump 38 for feeding working oil to the clutch 37, and a valve 40 disposed in an oil path 39 between the pump 38 and the clutch 37.

In order to prevent the power turbine 7 from rotating at an excessively high speed, there is provided a sensor 41, which is of a contact type or a noncontact type, for detecting in terms of a pulse number the rotational speed of the power turbine 7, and a controller 42 for closing/opening the first to fourth shut-off valves 13, 14, 12, and 11 in accordance with the signals detected by the sensor 41. The controller 42 receives at its input an ON-OFF signal from a clutch switch (not shown) of the engine 1, a ON-OFF signal from an accelerator switch (not shown), an engine rotational speed signal, a brake control switch signal, and a rotational speed pulse signal from the sensor 41 while the output suppplies control signals for the first through fourth valves 13, 14, 12 and 11, as well as for the valve 40 for the reversing mechanism 17.

Figure 3:
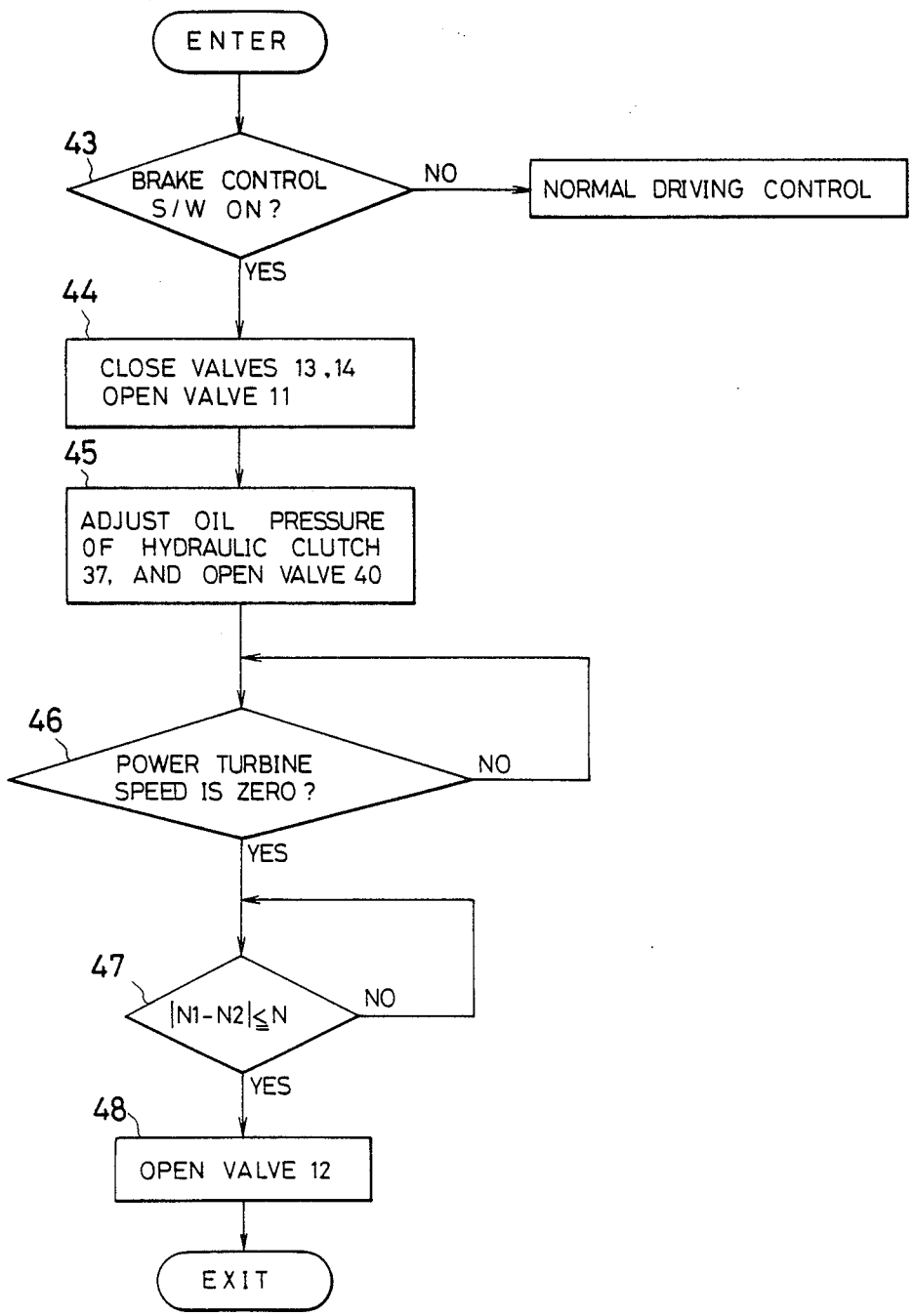
FIG. 3 is a flow chart of a controller according to the present invention.

Operation of the controller 42 will be now explained with reference to the flow chart in FIG. 3. When the accelerator switch and the clutch switch are both OFF, engine rotating speed is, for example, over 700 rpm, and the brake control switch is ON at step 43, the controller 42 outputs signals to close the valves 13 and 14 since the vehicle is in a deceleration mode. Then, the controller 42 outputs a signal to open the fourth valve 11 at step 44, and another signal to open the valve 40 at the step 45 so as to turn the hydraulic clutch 35 into its connection mode. Thereupon, rotational power of the crankshaft 16 is transmitted to the power turbine 7 through the reversing mechanism 17 so that rotational power is applied in the counter direction against the direction the power turbine 7 is rotating in. After that, the controller 42 detects at the step 46 if the power turbine is rotating, based on the signal detected by the sensor 41. After detecting that the power turbine rotating speed has become zero, a difference between the rotation-speed indicating pulse numbers of the power turbine 7, N1 and N2, (|N1–N2|), N2 being detected several seconds after the detection of N1, is detected, and at the step 47 it is judged if such difference is equal to or less than a predetermined pulse number N. This step is provided in order to allow the power turbine to perform the exhaust gas mixing work until the power turbine rotating speed reaches a predetermined speed after the power turbine starts rotating in a reverse sense. Accordingly, the predetermined value N is determined by experiments, varying with the type of the power turbine. If the pulse number difference |N1–N2| is equal to N at the step 47, the controller 42 outputs a signal to the third valve 12 to open the intake air bypass line 9 as stated in the step 48, whereby air is introduced through the bypass line 9 in response to the power turbine rotation, allowing the power turbine 7 to perform air compressing work. In the illustrated embodiment, the judgement at the step 47 is conducted by the difference of the pulse numbers, which substantially corresponds to the acceleration. However, it is also acceptable to compare, for example, N1 with N, so that if N1 is smaller than N, the step 47 will be followed by the step 48 and otherwise the step 47 will be repeated.

Figure 4:
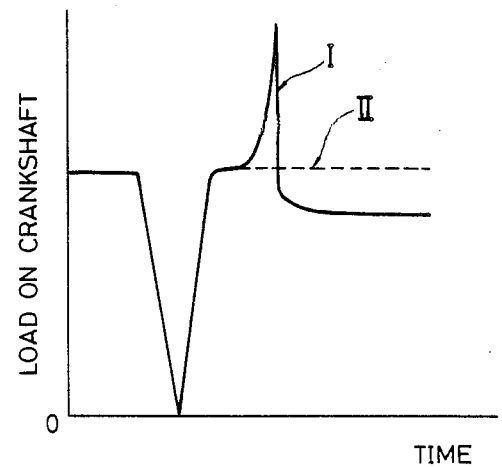
FIG. 4 illustrates braking effort characteristic curves.

As can be appreciated from the above description, since the third valve 12 is kept closed until a certain condition is met, the power turbine 7 does not perform air mixing work and compressing work at the same time until this certain condition is satisfied after the power turbine 7 starts rotating in a reverse sense. The compressing work is added to the air mixing work after the third valve 12 is opened in such a fashion that the air mixing work may be maintained at its peak and the compressing work may be added to such mixing work. As a result, as indicated by curve II in FIG. 4, no overshoot appears having a level profile.

During normal driving, the controller 42 opens the first and second valves 13 and 14 while closing the fourth and third valves 11 and 12 as well as the valve 40.

Figure 5:
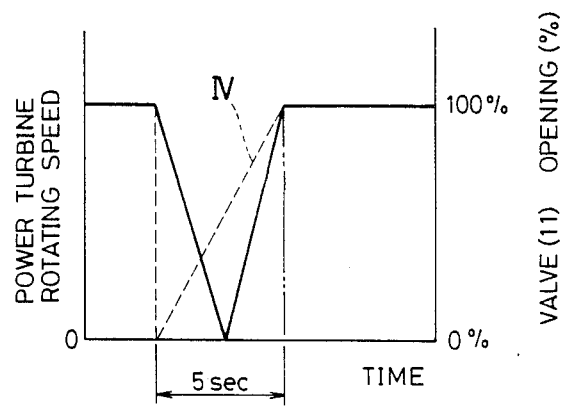
FIG. 5 is a diagram indicating shut-off valve control in which the dotted line indicates timer control and the solid line indicates control by a controller.
Figure 6:
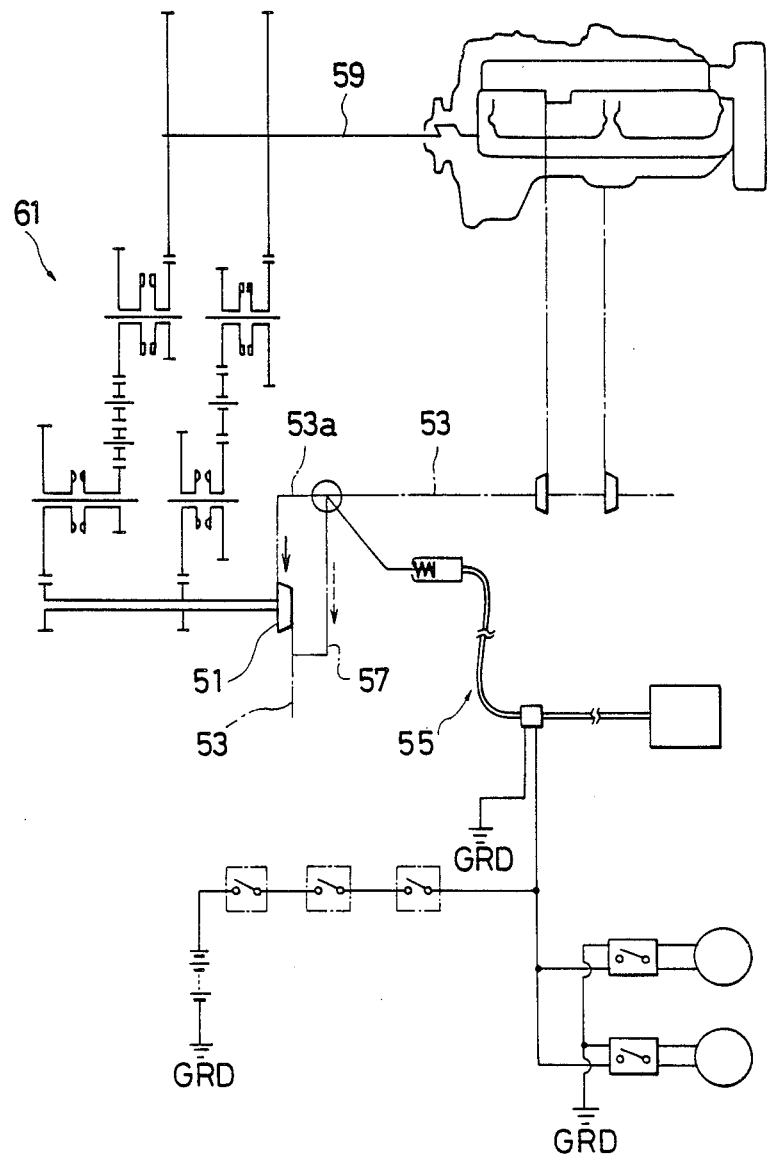
FIG. 6 depicts a turbo compound engine comprising a related art.

In the illustrated embodiment, the third valve 12 in the intake air bypass line 9 is actuated by the controller 42. However, the third valve 12 may be driven by a cylinder whose movement is controlled by a timer or a orifice, so that the third valve 12 will be slowly and linearly opened in five seconds soon after the brake control switch is turned on, as indicated by a dotted line IV in FIG. 5, thereby preventing the power turbine 7 from rotating at unduly high speed, i.e., preventing the overshoot. In FIG. 5, the dotted line indicates timer control, and the solid line indicates control by the controller 42. Both of the curves shown in FIG. 5 indicate power turbine rotating speed and valve opening on the respective ordinants thereof.

I claim:

1. A turbo compound engine comprising:
   an engine having an intake air passage, an exhaust gas passage and a crankshaft;
   a power turbine disposed in the exhaust gas passage so as to be rotatable in normal and reverse senses;
   a reversing mechanism for connecting the power turbine with the crankshaft in a manner such that the power turbine and the crankshaft may rotate in the same direction or the opposite direction in accordance with switching thereof;
   an exhaust bypass line connected to the exhaust gas line at two junctions so as to bypass the power turbine;
   first and second shut-off valves respectively disposed in the exhaust gas line upstream of said two junctions of the exhaust bypass line and the exhaust gas passage, so that they may be closed upon reversed switching of the reversing mechanism;
   an intake air bypass line connected to the intake air passage at one end thereof and to the exhaust gas passage downstream of the power turbine and upstream of one of the junctions with the exhaust bypass line at the other end;
   a third shut-off valve disposed in the intake air bypass line; and,
   control means for detecting the rotation of the power turbine, and for opening the third shut-off valve when the control means detects that the rotation of the power turbine is reversed and reaches a predetermined value.

2. A turbo compound engine of claim 1, wherein the power turbine includes an output gear, and the reversing mechanism includes:
   a first planetary gear mechanism engaged with said output gear;
   a fluid coupling which rotates with a part of the first planetary gear mechanism;
   a first transmission gear connected to the fluid coupling; and
   a second planetary gear mechanism engaged with the first transmission gear.

3. A turbo compound engine of claim 1, wherein the first planetary gear mechanism includes a plurality of planetary gears geared with the output gear of the power turbine and a ring gear geared with the plurality of planetary gears,
   the fluid coupling includes an output pump wheel and a locking-up mechanism, and
   said ring gear rotates with said output pump wheel.

4. A turbo compound engine of claim 3, wherein the second planetary gear mechanism includes:
   a sun gear;
   a plurality of planetary gears geared with the sun gear, the the planetary gears surrounding the sun gear;
   a carrier to allow the planetary gears to rotate around the sun gear as well as around axes of themselves;
   a second transmission gear geared with the first transmission gear;
   a one-way clutch interposed between the crankshaft and the second transmission gear so as to only allow the rotational power to be transmitted from the second transmission gear to the crankshaft;
   a third transmission gear disposed coaxially with the second transmission gear so as to transmit rotation power of the crankshaft to the second transmission gear via the one-way clutch; and
   hydraulic clutch means for freeing and stopping the carrier.

5. A turbo compound engine of claim 1, further including a fixed throttling for adjusting the flow rate of the exhaust gas in the exhaust bypass line, and a fourth shut-off valve for opening and closing the exhaust bypass line, the fixed throttling being located upstream of the fourth shut-off valve near the downstream end, viewed in the direction of the exhaust gas flows, of the exhaust bypass line.

6. A turbo compound engine of claim 1, wherein the first, second, and third shut-off valves are electromagnetic valves.

7. A turbo compound engine of claim 5, wherein the fourth shut-off valve is an electromagnetic valve.

8. A turbo compound engine of claim 1, further including a sensor for detecting a rotational speed of the power turbine and a controller for closing and opening the first, second and third shut-off valves based on the rotational speed detected by the sensor, so that the power turbine may not rotate beyond a predetermined rotational speed.

9. A turbo compound engine of claim 5, further including a sensor for detecting the rotational speed of the power turbine and a controller for closing and opening the first, second, third and fourth shut-off valves based on the rotational speed detected by the sensor, so that the power turbine may not rotate beyond a predetermined rotational speed.

10. A turbo compound engine of claim 9, wherein the controller causes the first and second valves to open while closing the third and fourth shut-off valves when the engine is running under normal conditions.

11. A turbo compound engine of claim 5, wherein the fixed throttling has configuration which optimizes pressure across the power turbine.

* * * * *